United States Patent
Ku

(10) Patent No.: US 7,636,560 B2
(45) Date of Patent: Dec. 22, 2009

(54) APPARATUS AND METHOD FOR EFFICIENTLY USING ANTENNAS IN A MOBILE COMMUNICATION TERMINAL HAVING BLUETOOTH AND WIRELESS LOCAL AREA NETWORK MODULES

(75) Inventor: Hyun-Chul Ku, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 597 days.

(21) Appl. No.: 11/333,380

(22) Filed: Jan. 17, 2006

(65) Prior Publication Data

US 2006/0160563 A1    Jul. 20, 2006

(30) Foreign Application Priority Data

Jan. 17, 2005    (KR) ...................... 10-2005-0004042

(51) Int. Cl.
*H04B 7/00*    (2006.01)
(52) U.S. Cl. .................... 455/272; 455/41.3; 455/552.1; 455/560
(58) Field of Classification Search ................ 455/422, 455/403, 41.2, 41.3, 550.1, 552.1, 560; 375/142, 375/144
See application file for complete search history.

(56) References Cited

U.S. PATENT DOCUMENTS

| | | | |
|---|---|---|---|
| 6,728,517 B2 * | 4/2004 | Sugar et al. | 455/73 |
| 7,117,013 B2 * | 10/2006 | Cromer et al. | 455/558 |
| 7,190,974 B2 * | 3/2007 | Efland et al. | 455/562.1 |
| 7,212,499 B2 * | 5/2007 | Hoffmann et al. | 370/252 |
| 7,260,370 B2 * | 8/2007 | Wang et al. | 455/135 |
| 2006/0025171 A1 | 2/2006 | Ly et al. | |

FOREIGN PATENT DOCUMENTS

| | | |
|---|---|---|
| EP | 1 083 622 | 3/2001 |
| EP | 1 388 951 | 2/2004 |
| WO | WO 2004/008719 | 1/2004 |

* cited by examiner

*Primary Examiner*—Tony T Nguyen
(74) *Attorney, Agent, or Firm*—The Farrell Law Firm, LLP

(57) ABSTRACT

A Wireless Local Area Network (WLAN) module and a Bluetooth module for a mobile communication terminal. A baseband unit for WLAN and Bluetooth, generates a signal indicating whether WLAN and Bluetooth services are in progress. A switch switches the at least two antennas to the Bluetooth module if only the Bluetooth service is in progress and switches the at least two antennas to the WLAN module if only the WLAN service is in progress. Therefore, antenna diversity is achieved if only one of the WLAN and Bluetooth services is in progress.

7 Claims, 3 Drawing Sheets

US 7,636,560 B2

APPARATUS AND METHOD FOR EFFICIENTLY USING ANTENNAS IN A MOBILE COMMUNICATION TERMINAL HAVING BLUETOOTH AND WIRELESS LOCAL AREA NETWORK MODULES

PRIORITY

This application claims priority under 35 U.S.C. §119 to an application entitled "Apparatus And Method For Efficiently Using Antennas In A Mobile Communication Terminal Having Bluetooth And Wireless Local Area Network Modules" filed in the Korean Intellectual Property Office on Jan. 17, 2005 and assigned Ser. No. 2005-4042, the contents of which are incorporated herein by reference.

BACKGROUND OF THE INVENTION

1. Field of the Invention

The present invention relates generally to an apparatus and method for efficiently using antennas in a mobile communication terminal having wireless communication modules (such as Bluetooth) and Wireless Local Area Network (WLAN) modules, and in particular, to an apparatus and method for achieving antenna diversity and thus improving the reception sensitivity of Bluetooth and WLAN signals in a mobile communication terminal having Bluetooth and WLAN modules.

2. Description of the Related Art

Recent years have witnessed the proliferation of mobile communication terminals due to their portable convenience. The growing use of the mobile communication terminals has driven service providers and terminal manufacturers to develop terminals with additional and more convenient functions in order to attract more users.

Traditionally, mobile communication terminals support only Wireless Wide Area Network (WWAN) such as Code Division Multiple Access (CDMA) and Personal Communication Service (PCS). As they have recently been further equipped with more and convenient functions, WLAN and Wireless Personal Area Network (WPAN) systems including Institute of Electrical and Electronics Engineers (IEEE) 802/a/b/g, Bluetooth and Zigbee are added to the mobile communication terminals.

A WLAN transmits and receives over the air using radio frequency (RF) or light, thus ensuring user mobility and facilitating extension, repair and maintenance. Especially the IEEE 802.11 system offers a data rate of 11 Mbps in the 2.4 GHz band.

Bluetooth is a standard for short-range, low-cost radio links between electronic devices such as mobile personal computers (PCs) and mobile phones. It allows transfer of voice and data between digital devices without using cables. Bluetooth operates at 2.4 GHz, serving up to 1 Mbps in a range limited to 10 m.

FIG. 1 is a block diagram of a conventional mobile communication terminal having Bluetooth and WLAN modules. Referring to FIG. 1, a mobile communication terminal 100 includes a WWAN antenna 101, a communication module 107, a controller 109, a memory 111, a WLAN antenna 103, a WLAN module 113, a Bluetooth antenna 105, and a Bluetooth module 115. The communication module 107 covers all of $1^{st}$ generation analog communications, $2^{nd}$ generation CDMA, $2.5^{th}$ generation PCS, and $3^{rd}$ generation Code Division Multiple Access 2000 (CDMA2000).

The controller 109 provides overall control to the mobile communication terminal 100. For example, it processes and controls voice and data received from the communication module 107, the WLAN module 113, and the Bluetooth module 115.

The memory 111 includes a Read Only Memory (ROM), a Random Access Memory (RAM), and a flash ROM (not shown). The ROM stores the micro-codes of programs, needed for processing and controlling in the controller 109, and reference data. The RAM is a working memory of the controller 109, for temporarily storing data generated during execution of the programs. The flash ROM stores updatable data to be kept, such as a phone book and incoming/outgoing messages.

The WWAN antenna 101 transmits/receives RF signals in a band of 869 to 894 MHz in CDMA and in a band of 1930 to 1990 MHz in PCS. The communication module 107 processes RF signals received and transmitted through the WWAN antenna 101 according to a CDMA standard (e.g. IS-95).

When receiving an RF signal through the WWAN antenna 101, the communication module 107 downconverts the RF signal to a baseband signal and despreads and channel-decodes the baseband signal. For transmission, the communication module 107 spreads and channel-encodes transmission data, upconverts the coded data to an RF signal, and transmits the RF signal through the WWAN antenna 101.

The WLAN antenna 103 transmits/receives an RF signal in the 2.4 GHz band to/from an access point (AP) in the case of IEEE 802.11b. For reception, the WLAN module 113 downconverts an RF signal received through the WLAN antenna 103 to a baseband signal, converts the baseband signal to a digital signal through a low-pass filter (LPF) and an analog-to-digital (A/D) converter, and provides the digital data to the controller 109. For transmission, the WLAN module 113 modulates transmission data, converts the WLAN digital information to a baseband analog signal through a digital-to-analog (D/A) converter, upconverts the baseband analog signal to an RF signal, and transmits the RF signal through the WLAN antenna 103. The WLAN module 113 is so configured that transmission is enabled with reception disabled and reception is enabled with transmission disabled.

The Bluetooth antenna 105 transmits/receives an RF signal in the 2.4 GHz band at a data rate of 1 Mbps, for short-range radio communications at a low rate. The Bluetooth module 115 downconverts a received RF signal to a baseband signal, converts the analog signal to a digital signal, and provides the digital signal to the controller 109. It also converts transmission data to an analog signal, upconverts the analog signal to an RF signal, and transmits the RF signal through the Bluetooth antenna 105.

As described above, the WLAN module 113 and the Bluetooth module 15 operate in independent RF paths. Although they use the same 2.4 GHz Industrial Scientific Medical (ISM) band, both modules are so configured that their baseband units (not shown) exchange predetermined signals and correspondingly operate according to their priority levels in order to ensure coexistence between them.

If one of the WLAN and Bluetooth systems is used in the 2.4 GHz ISM band, the RF antenna of the other system becomes idle. Moreover, in the case of applying antenna diversity with the purpose of increasing the reception rates of the WLAN and Bluetooth systems, each system requires a plurality of antennas which occupy more area.

SUMMARY OF THE INVENTION

An object of the present invention is to substantially solve at least the above problems and/or disadvantages and to provide at least the advantages below. Accordingly, an object of the present invention is to provide an apparatus and method for sharing antennas between a Bluetooth system and a WLAN system in a mobile communication terminal having Bluetooth and WLAN modules. Another object of the present invention is to provide an apparatus and method for achieving antenna diversity by sharing antennas between a Bluetooth system and a WLAN system in a mobile communication terminal having Bluetooth and WLAN modules.

The above objects are achieved by providing an apparatus and method for efficiently using antennas in a mobile communication terminal having a WLAN module and a Bluetooth module.

According to one aspect of the present invention, in an apparatus for achieving antenna diversity in a mobile communication terminal that operates in a plurality of communication modes at the same frequency, at least two antennas are provided. A baseband unit generates a predetermined signal indicating whether communications are in progress in the plurality of communication modes. A switch switches the at least two antennas to operate in a first communication mode if the predetermined signal indicates that communications are in progress only in the first communication mode, and switches the at least two antennas to operate in a second communication mode if the predetermined signal indicates that communications are in progress only in the second communication mode. Therefore, antenna diversity is achieved if all of the communication modes are not in use for communications.

According to another aspect of the present invention, in an apparatus for achieving antenna diversity in a mobile communication terminal having a WLAN module and a Bluetooth module using the same frequency, at least two antennas are provided. A baseband unit for WLAN and Bluetooth generates a signal indicating whether WLAN and Bluetooth services are in progress. A switch switches the at least two antennas to the Bluetooth module if only the Bluetooth service is in progress and switches the at least two antennas to the WLAN module if only the WLAN service is in progress. Therefore, antenna diversity is achieved if only one of the WLAN and Bluetooth services is in progress.

According to a further aspect of the present invention, in a method of achieving antenna diversity in a mobile communication terminal that operates in a plurality of communication modes at the same frequency, if communications are in progress only in a first communication mode, antennas that are intended to operate for the other communication modes are operated in the first communication mode. If communications are in progress only in a second communication mode, antennas that are intended to operate for the other communication modes are operated in the second communication mode. Therefore, antenna diversity is achieved if all of the communication modes are not in use for communications.

According to still another aspect of the present invention, in a method of achieving antenna diversity in a mobile communication terminal having a WLAN module and a Bluetooth module using the same frequency, a WLAN antenna is connected to a first WLAN RF path and a Bluetooth antenna is connected to a second WLAN RF path, if only the WLAN module is in use for communications. The WLAN antenna is connected to a second Bluetooth RF path and the Bluetooth antenna is connected to a first Bluetooth RF path, if only the Bluetooth module is in use for communications. Therefore, antenna diversity is achieved if only one of the WLAN and Bluetooth modules is in use for communications.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
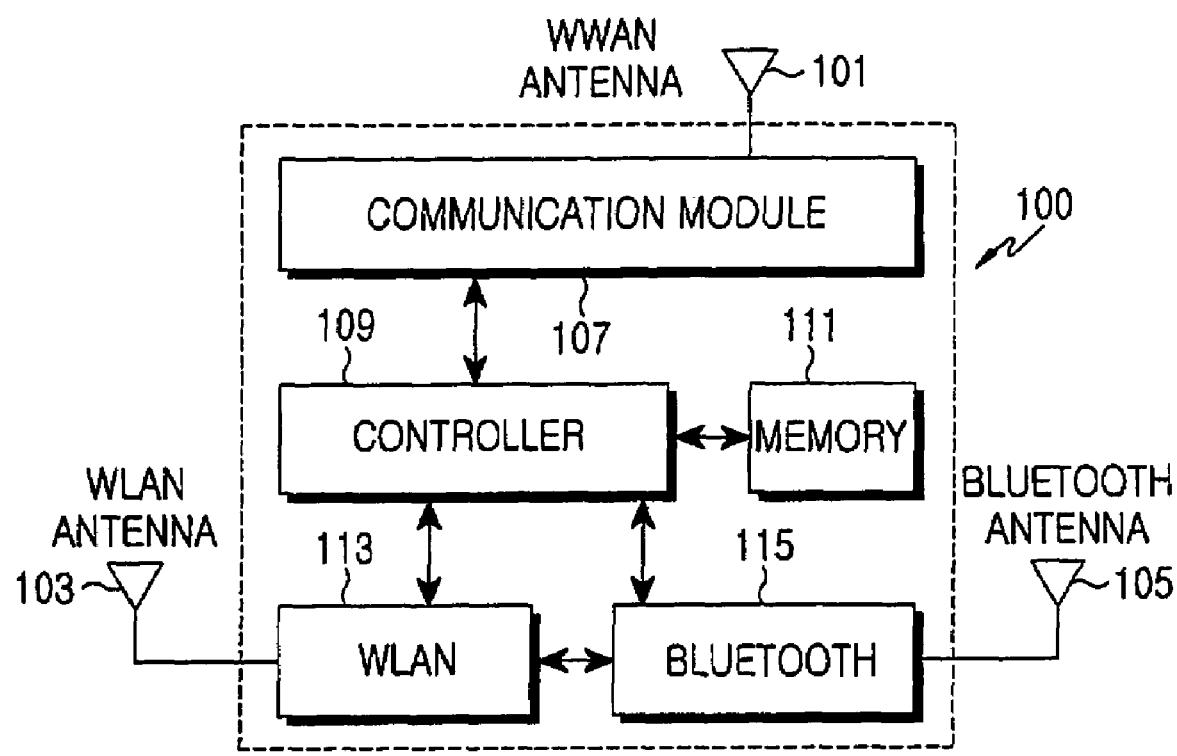
FIG. 1 is a block diagram of a conventional mobile communication terminal having Bluetooth and WLAN modules.
Figure 2:
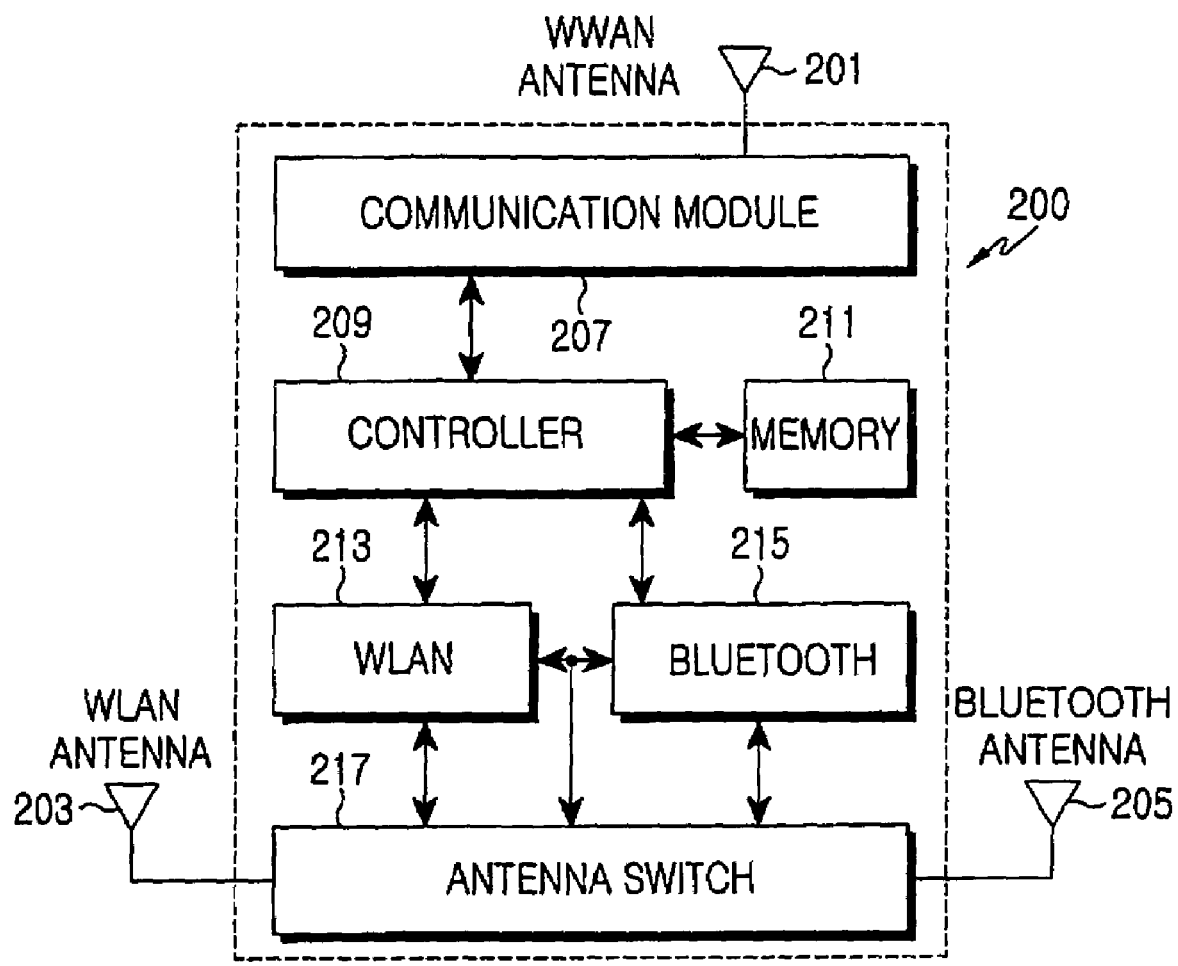
FIG. 2 is a block diagram of a mobile communication terminal for achieving antenna diversity using Bluetooth and WLAN antennas according to the present invention.
Figure 3:
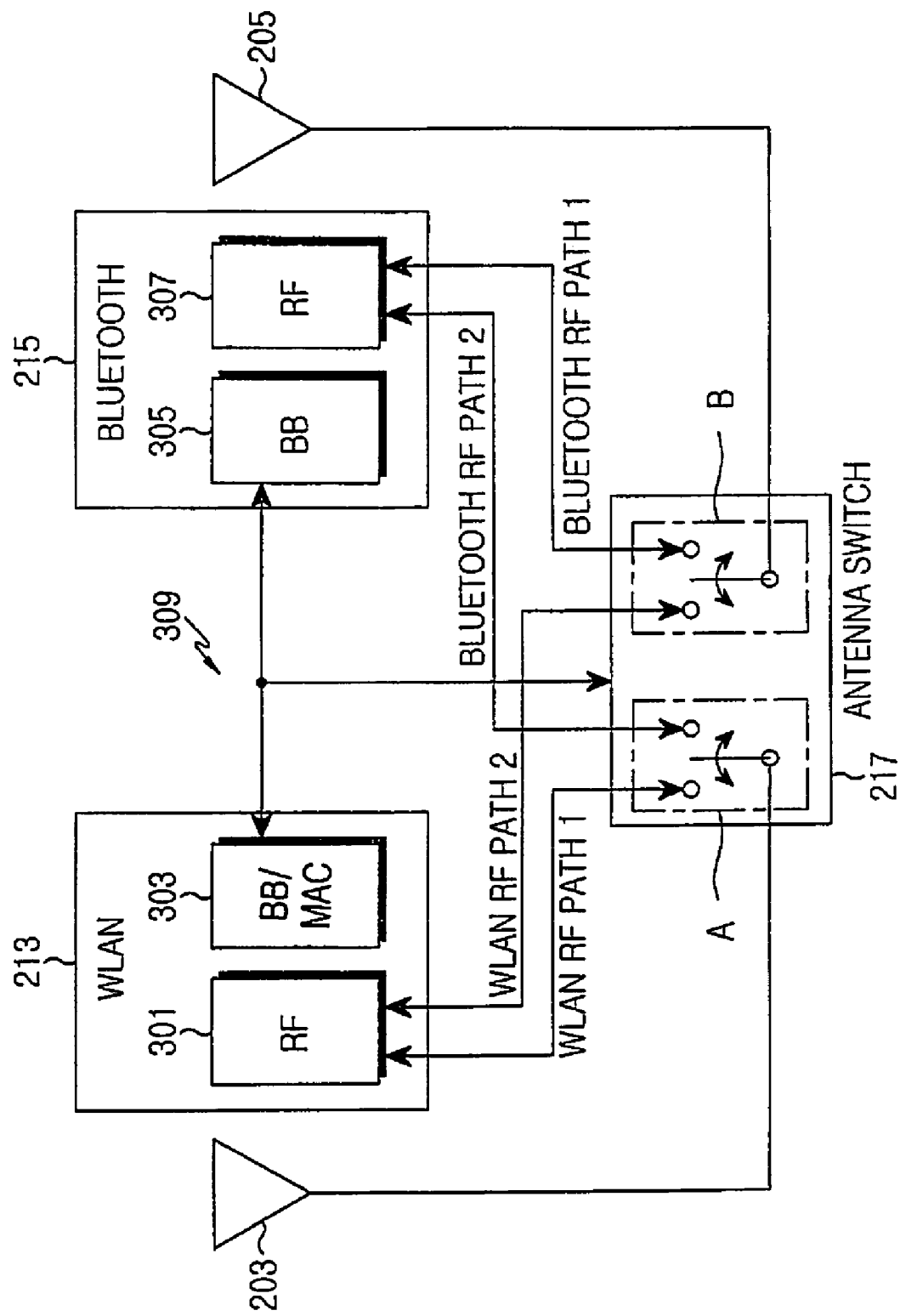
FIG. 3 is a diagram of an antenna switch used to achieve antenna diversity using the Bluetooth and WLAN antennas according to the present invention.

FIGS. 2 and 3 are block diagrams of a mobile communication terminal for achieving antenna diversity using Bluetooth and WLAN antennas according to the present invention.

FIG. 2 is a block diagram of a mobile communication terminal for achieving antenna diversity using Bluetooth and WLAN antennas according to the present invention. FIG. 3 is a block diagram of an antenna switch used to achieve antenna diversity using the Bluetooth and WLAN antennas illustrated in FIG. 2.

Referring to FIGS. 2 and 3, a mobile communication terminal 200 includes a WWAN antenna 201, a communication module 207, a controller 209, a memory 211, a WLAN antenna 203, a WLAN module 213, a Bluetooth antenna 205, a Bluetooth module 215, and an antenna switch 217. The communication module 207 covers all of $1^{st}$ generation analog, $2^{nd}$ generation CDMA, $2.5^{th}$ generation PCS, and $3^{rd}$ generation CDMA 2000 communications.

The controller 209 provides overall control to the mobile communication terminal 200. For example, it processes and controls voice and data communications.

The memory 211 includes a ROM, a RAM, and a flash ROM (not shown). The ROM stores the micro-codes of programs, needed for processing and controlling in the controller 209, and reference data. The RAM is a working memory of the controller 209, for temporarily storing data generated during execution of the programs. The flash ROM stores updatable data to be kept, such as a phone book and incoming/outgoing messages.

The WWAN antenna 201 transmits/receives RF signals in a band of 869 to 894 MHz in CDMA and in a band of 1930 to 1990 MHz in PCS. The communication module 207 processes RF signals received and transmitted through the WWAN antenna 201 according to a CDMA standard (e.g. IS-95).

When receiving an RF signal through the WWAN antenna 201, the communication module 207 downconverts the RF signal to a baseband signal and despreads and channel-decodes the baseband signal. For transmission, the communication module 207 spreads and channel-encodes transmission data, upconverts the coded data to an RF signal, and transmits the RF signal through the WWAN antenna 201.

The WLAN antenna 203 transmits/receives an RF signal in the 2.4 GHz band to/from an AP for IEEE 802.11b. As illustrated in FIG. 3, the WLAN module 213 includes an RF unit 301 and a baseband (BB) unit 303. The RF unit 301 downconverts an RF signal received through the WLAN antenna 203 and the Bluetooth antenna 205 to a baseband signal, and provides the baseband signal to the BB unit 303. It also upconverts a baseband signal received from the BB unit 303 to an RF signal and transmits the RF signal through the WLAN antenna 203 and the Bluetooth antenna 205.

The BB unit 303 is interposed between the RF unit 301 and the controller 209 and processes baseband signals. For example, upon receipt of a baseband signal from the RF unit 301, the BB unit 303 converts the baseband analog signal to a digital signal through an LPF and an A/D converter, and provides the digital data to the controller 209. For transmission, the BB unit 303 converts digital information to be transmitted to a baseband analog signal through a D/A converter and provides the baseband analog signal to the RF unit 301. In addition, the BB unit 303 generates a signal indicating whether the WLAN service is on-going or not and transmits it to a BB unit 305 of the Bluetooth module 215, and receives from the BB unit 305 a signal indicating whether the Bluetooth service is on-going or not in order to ensure coexistence between both systems. These signals are delivered on a coexistence signal channel 309.

The Bluetooth antenna 205 transmits/receives an RF signal in the 2.4 GHz band at a data rate of 1 Mbps, for short-range radio communications at a low rate. As illustrated in FIG. 3, the Bluetooth module 215 includes an RF unit 307 and the BB unit 305. The RF unit 307 downconverts an RF signal received through the Bluetooth antenna 205 and the WLAN antenna 203 to a baseband signal, and provides the baseband signal to the BB unit 305. It also upconverts a baseband signal received from the BB unit 305 to an RF signal and transmits the RF signal through the Bluetooth antenna 205 and the WLAN antenna 203.

The BB unit 305 is interposed between the RF unit 307 and the controller 209 and processes baseband signals. As described before, the BB unit 303 and the BB unit 305 generate signals indicating whether the WLAN system and the Bluetooth system are operating and exchange them on the coexistence signal channel 309.

As described above, since the WLAN module 213 and the Bluetooth module 215 operate in independent RF paths, the BB unit 303 and the BB unit 305 generate 2-bit signals indicating whether the WLAN module 213 and the Bluetooth module 215 are now operating, and exchange the signals with each other. The two systems then operate according to their priority levels based on the received signals, to thereby ensure their coexistence. For example, if the WLAN module 213 is operating, the BB unit 303 generates a signal of "10". If the WLAN module 213 is inoperative, the BB unit 303 generates a signal of "00". If the Bluetooth module 215 is operating, the BB unit 305 generates a signal of "01". If the Bluetooth module 215 is inoperative, the BB unit 305 generates a signal of "00".

When one of the two systems is in use, the 2-bit signals serve to control the antenna switch 217 to use the antenna of the other system for the operating system.

Referring to FIG. 3, the antenna switch 217 includes a 4×2 switch or two 2×1 switches. The antenna switch 217 ORoperates the 2-bit signals and switches the WLAN antenna 203 and the Bluetooth antenna 205 to an appropriate RF path.

For example, when the user uses only the WLAN service, the OR-gated coexistence channel signal is "10" ("10" for WLAN and "00" for Bluetooth). Thus, a switch A connects the WLAN antenna 203 to WLAN RF PATH 1 and a switch B connects the Bluetooth antenna 205 to WLAN RF PATH 2, thereby supporting antenna diversity for the WLAN module 213.

When the user uses only the Bluetooth service, the ORgated coexistence channel signal is "01" ("00" for WLAN and "01" for Bluetooth). Thus, the switch A connects the WLAN antenna 203 to Bluetooth RF PATH 2 and the switch B connects the Bluetooth antenna 205 to Bluetooth RF PATH 1, thereby supporting antenna diversity for the Bluetooth module 215.

If the user uses both the WLAN service and the Bluetooth service, the OR-gated coexistence channel signal is "11" ("10" for WLAN and "01" for Bluetooth). Thus, the switch A connects the WLAN antenna 203 to WLAN RF PATH 1 and the switch B connects the Bluetooth antenna 205 to Bluetooth RF PATH 1.

While the antenna switch 217 is controlled by the signals generating from the BB units 303 and 305, indicating whether the WLAN and Bluetooth systems are operating in the above embodiment, it can be contemplated as another embodiment that the controller 209 determines the states of both systems and correspondingly controls the antenna switch 217.

In accordance with the present invention, in the case where Bluetooth and WLAN operate in independent RF paths in a mobile communication terminal having Bluetooth and WLAN modules, one system in use shares the antenna of the other system or one system with a higher priority level shares the antenna of the other system. Therefore, antenna diversity can be achieved without the need for additional antennas. Power consumption is reduced when the antenna of the other system becomes idle, compared to what might otherwise be encountered when one system only is operative.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for achieving antenna diversity in a mobile communication terminal having a plurality of communication modules operating at the same frequency, comprising:
at least two antennas;
a baseband unit for generating a predetermined signal indicating whether communications is in progress in the plurality of communication modules; and
a switch for switching the at least two antennas to a first communication module if the predetermined signal indicates that communication is in progress only in a first communication mode, and switching the at least two antennas in a second communication module if the predetermined signal indicates that communication is in progress only in a second communication mode, and switching at least one of the at least two antennas to each of the communication modules, respectively, if the first and second communication modes are in progress simultaneously,
thereby achieving antenna diversity if all the communication modules are not in use for communication.

2. The apparatus of claim 1, wherein the switch is configured according to the number of the communication modules.

3. An apparatus for achieving antenna diversity in a mobile communication terminal having a wireless local area network (WLAN) module and a Bluetooth module using the same frequency, comprising:
at least two antennas;
a baseband unit for WLAN and Bluetooth, for generating a signal indicating whether WLAN and Bluetooth services are in progress;
a switch for switching the at least two antennas to the Bluetooth module if only the Bluetooth service is in progress and switching the at least two antennas to the WLAN module if only the WLAN service is in progress, and switching at least one of the at least two antennas to each of the WLAN and Bluetooth modules, respectively, if the WLAN and Bluetooth services are in progress simultaneously, thereby achieving antenna diversity if only one of the WLAN and Bluetooth services is in progress.

4. The apparatus of claim 3, wherein the switch is one of a single 4×2 switch and two 2×1 switches.

5. The apparatus of claim 3, wherein the operating frequency used by the Bluetooth module and the WLAN module is a 2.4 GHz industrial scientific medical (ISM) band.

6. A method of achieving antenna diversity in a mobile communication terminal having a plurality of communication modules operating at the same frequency, comprising the steps of:

switching at least two antennas to a first communication module if communication is in progress only in a first communication mode;

switching the at least two antennas to a second communication module if communication is in progress only in a second communication mode; and switching at least one of the at least two antennas to each of the communication modules, respectively, if the first and second communication modes are in progress simultaneously, thereby achieving antenna diversity if all of the communication modules are not in use for communication.

7. A method of achieving antenna diversity in a mobile communication terminal having a wireless local area network (WLAN) module and a Bluetooth module using the same frequency, comprising the steps of:

connecting a WLAN antenna to a first WLAN radio frequency (RF) path and connecting a Bluetooth antenna to a second WLAN RF path, if only the WLAN module is in use for communication;

connecting the WLAN antenna to a second Bluetooth RF path and connecting the Bluetooth antenna to a first Bluetooth RF path, if only the Bluetooth module is in use for communication; and connecting the WLAN antenna to the first WLAN RF path and connecting the Bluetooth antenna to the first Bluetooth RF path, if the WLAN and Bluetooth modules are in use for communication simultaneously, thereby achieving antenna diversity if only one of the WLAN and Bluetooth modules is in use for communication.

* * * * *

UNITED STATES PATENT AND TRADEMARK OFFICE
CERTIFICATE OF CORRECTION

PATENT NO. : 7,636,560 B2 Page 1 of 1
APPLICATION NO. : 11/333380
DATED : December 22, 2009
INVENTOR(S) : Hyun-Chul Ku It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Twenty-first Day of December, 2010

David J. Kappos
*Director of the United States Patent and Trademark Office*